US 8,000,868 B2

(12) United States Patent
Kurrle et al.

(10) Patent No.: US 8,000,868 B2
(45) Date of Patent: Aug. 16, 2011

(54) METHOD AND CONTROL UNIT FOR CONTROLLING A FRICTION CLUTCH BETWEEN AN INTERNAL COMBUSTION ENGINE AND A CHANGE SPEED TRANSMISSION

(75) Inventors: Frank Kurrle, Pleidelsheim (DE); Katja Treutner, Rutesheim (DE); Peter Baur, Moensheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 992 days.

(21) Appl. No.: 11/858,153

(22) Filed: Sep. 20, 2007

(65) Prior Publication Data

US 2008/0071450 A1 Mar. 20, 2008

(30) Foreign Application Priority Data

Sep. 20, 2006 (DE) .......................... 10 2006 044 273

(51) Int. Cl.
G06F 19/00 (2011.01)
(52) U.S. Cl. .............. 701/67; 701/53; 701/54; 701/101; 477/5; 477/107; 477/109; 477/205; 123/198 F; 123/59.6; 123/179.22; 123/561; 464/68.2; 464/68.3; 464/68.41; 192/208; 192/213.21; 192/213.22; 903/903; 903/910
(58) Field of Classification Search .................... 701/51, 701/53, 54, 101; 477/5, 107, 109, 205; 123/198 F, 123/59.6, 179.22, 561; 464/68.2, 68.3, 68.41, 464/46; 192/208, 213.22, 213.21; 903/910, 903/903; 180/165; 74/7 R, 7 C
See application file for complete search history.

(56) References Cited

U.S. PATENT DOCUMENTS

| 2,689,920 | A | * | 9/1954 | Jaeschke ......................... 310/94 |
| 4,803,628 | A | * | 2/1989 | Hayashi et al. .................. 701/68 |
| 4,982,620 | A | * | 1/1991 | Holbrook et al. ............. 74/731.1 |
| 5,067,599 | A | * | 11/1991 | Roder et al. .................... 477/176 |
| 5,560,465 | A | * | 10/1996 | Zindler ................... 192/105 BA |
| 6,095,943 | A | * | 8/2000 | Reuthal ........................... 477/86 |
| 2001/0016539 | A1 | * | 8/2001 | Yuasa et al. .................... 477/143 |
| 2003/0216209 | A1 | * | 11/2003 | Gradu ............................ 475/151 |
| 2003/0233997 | A1 | * | 12/2003 | Kawaguchi et al. .......... 123/299 |
| 2004/0210374 | A1 | | 10/2004 | Werner et al. |
| 2006/0142918 | A1 | * | 6/2006 | Guggolz et al. ................ 701/51 |
| 2006/0264295 | A1 | * | 11/2006 | Toyoda et al. ................ 475/216 |
| 2007/0013231 | A1 | * | 1/2007 | Yamashita et al. ............. 307/9.1 |
| 2007/0191186 | A1 | * | 8/2007 | Bothe et al. .................... 477/175 |
| 2008/0147288 | A1 | * | 6/2008 | Reiher et al. .................... 701/84 |
| 2008/0195287 | A1 | * | 8/2008 | Janssen et al. .................. 701/67 |
| 2009/0320466 | A1 | * | 12/2009 | Vetrovec ......................... 60/602 |

FOREIGN PATENT DOCUMENTS

| DE | 3330332 A1 | 3/1985 |
| DE | 3738799 C2 | 7/1988 |
| DE | 10237793 A1 | 3/2003 |
| GB | 2145495 A | 3/1985 |

OTHER PUBLICATIONS

Heijden, Hybrid optimal control of dry clutch engagement, 2007, Internet, p. 1-87.*

* cited by examiner

Primary Examiner — James P Trammell
Assistant Examiner — McDieunel Marc

(57) ABSTRACT

A method controls a friction clutch disposed between an internal combustion engine and a change speed transmission. The friction clutch is controlled in such a way that it transmits an average coupling torque of the internal combustion engine and does not transmit periodically occurring peak values of the coupling torque. In addition, a control unit is programmed to carry out the method.

14 Claims, 4 Drawing Sheets

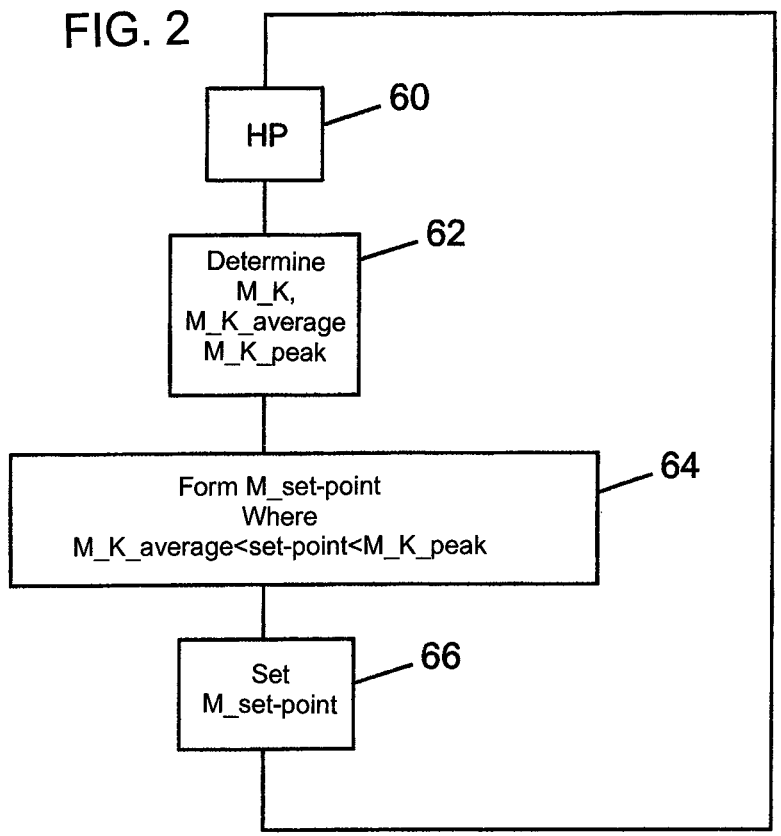
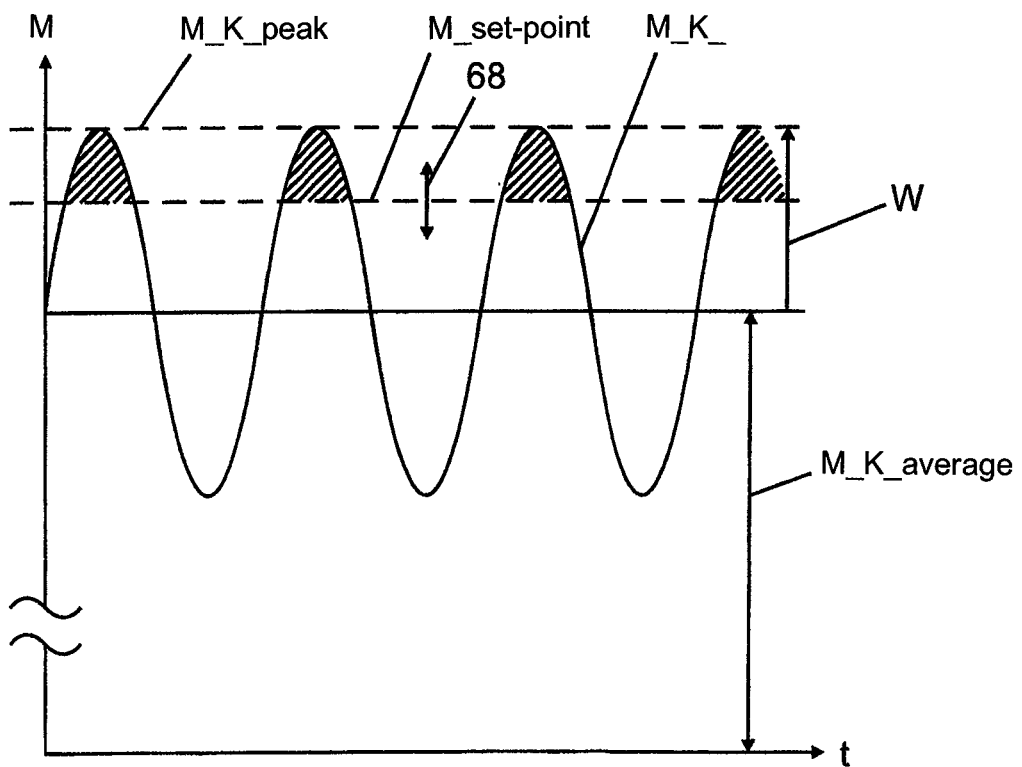

METHOD AND CONTROL UNIT FOR CONTROLLING A FRICTION CLUTCH BETWEEN AN INTERNAL COMBUSTION ENGINE AND A CHANGE SPEED TRANSMISSION

CROSS-REFERENCE TO RELATED APPLICATION

This application claims the priority, under 35 U.S.C. §119, of German application DE10 2006 044 273.3, filed Sep. 20, 2006; the prior application is herewith incorporated by reference in its entirety.

BACKGROUND OF THE INVENTION

Field of the Invention

The invention relates to both a method and a control unit for controlling a friction clutch between an internal combustion engine and a change speed transmission. In change speed transmissions which have to be switched manually, friction clutches are used to separate the power flux between the internal combustion engine and the transmission when starting and when shifting gear. In addition to systems in which a driver controls the power flux across the clutch with a clutch pedal and shifts the gear speed manually, systems are also known in which the clutch is controlled automatically both when starting and when shifting gear. Known examples are what are referred to as automated speed transforming transmissions and transmissions with double clutches such as direct speed transforming transmissions.

The automatic control is provided by electromechanical, electropneumatic or electrohydraulic actuator elements which permit continuous variation of the torque which is transmitted across the clutch.

In addition, friction clutches are used in what are referred to as fully automatic transmissions with planetary gear sets and a hydraulic torque converter between the internal combustion engine and the rest of the transmission in order to bridge the converter, if appropriate. In the transmissions they serve primarily to prevent slip occurring in the hydraulic torque converter under steady state conditions. These converter lockup clutches are closed automatically if a difference between a rotational speed on the input side of the converter and a rotational speed on the output side of the converter drops below the threshold value. The internal combustion engine constitutes, together with the other elements of the drive train, that is to say together with the clutch, transmissions, drive shafts and other shafts, a system which is capable of performing rotational oscillations. Rotational oscillations are excited, for example, by fluctuations in the angular speed of the crankshaft of the internal combustion engine when the clutch is closed, the fluctuations occurring during normal operation as a result of the discontinuous working mode of the internal combustion engine which is divided into cycles. These rotational oscillations can cause transmission rattle to be excited in the transmission, that is to say can cause rattling transmission noises such as with components which are installed with play. As a result of the rotational oscillations, the edge with which the component which is subject to play bears against other components changes. This changing of the edge which occurs under load during operation of the internal combustion engine is responsible for the disruptive rattling. Although the rattling does not adversely affect the functioning or the durability of the transmission, it is felt to be subjectively disruptive by the driver.

In order to remedy this, it is known to operate the converter lockup clutches with controlled slip in automatic transmissions. A difference in rotational speed between the input side and the output side of the clutch of the order of magnitude of 50 to 100 $\text{min}^{-1}$ serves as the variable to be controlled. Although this permitted slip costs energy, which is converted into frictional heat in the clutch, the energy loss is not as large as the energy loss in a hydraulic torque converter which is operated without a converter lockup clutch. However, it is to be noted that the noise advantage is paid for with an energy loss which reduces the efficiency of the drive train. In addition, the slip control requires rotational speeds on the input side and the output side of the clutch to reach a high resolution with respect to time and are thus complex to sense and process.

SUMMARY OF THE INVENTION

It is accordingly an object of the invention to provide a method and control unit for controlling a friction clutch between an internal combustion engine and a change speed transmission which overcome the above-mentioned disadvantages of the prior art methods and devices of this general type, with which the disruptive noise can be respectively eliminated and with which the aforesaid disadvantages of a reduced efficiency level and a complex control are at least alleviated.

With the foregoing and other objects in view there is provided, in accordance with the invention, a method for controlling a friction clutch between an internal combustion engine and a change speed transmission. The method includes controlling the friction clutch to transmit an average coupling torque of the internal combustion engine and not to transmit periodically occurring peak values of a coupling torque.

The invention is accordingly defined by the fact that the friction clutch is controlled in such a way that it transmits an average coupling torque of the internal combustion engine and permits the coupling torque to slip with reduced transmission of power when peak values of the coupling torque occur periodically. In this context, the coupling torque is understood to be the torque which is made available via the internal combustion engine as an input torque for the clutch. The coupling torque corresponds to the torque generated by the internal combustion engine after the torques which have been required to drive secondary assemblies are withdrawn.

Advantageously, the clutch is therefore controlled in such a way that in the case of a wave-shaped input torque it slips briefly precisely when the input torque exceeds a threshold value in a positive half wave, the threshold value defined by the maximum, set torque of the clutch which can be transmitted. As a result, exciting torque pulses are removed from the system which is capable of oscillating, and this removal has a damping effect on the oscillation. Furthermore, the moment of inertia of the internal combustion engine is separated from the moment of inertia of the rest of the drive train when the clutch briefly slips. As a result, the possible natural frequencies of rotational oscillations which are dependent on the moment of inertia of the system under consideration also change. This also counteracts amplification of a rotational oscillation which detects the transmission and thus causes the disruptive rattling of the transmission.

In contrast to the slip control, in the invention no permitted slip occurs at the clutch so that in total less energy is converted into heat in the clutch. As a result, the efficiency level of the drive train improves. In other words, the reduction in the efficiency level which is accepted in order to reduce the rattling noise is alleviated.

Other features which are considered as characteristic for the invention are set forth in the appended claims.

Although the invention is illustrated and described herein as embodied in a method and control unit for controlling a friction clutch between an internal combustion engine and a change speed transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a flow chart illuminating of an exemplary embodiment of a method according to the invention;

FIG. 3 is a graph showing time profiles of different torques;

DETAILED DESCRIPTION OF THE INVENTION

Figure 1:
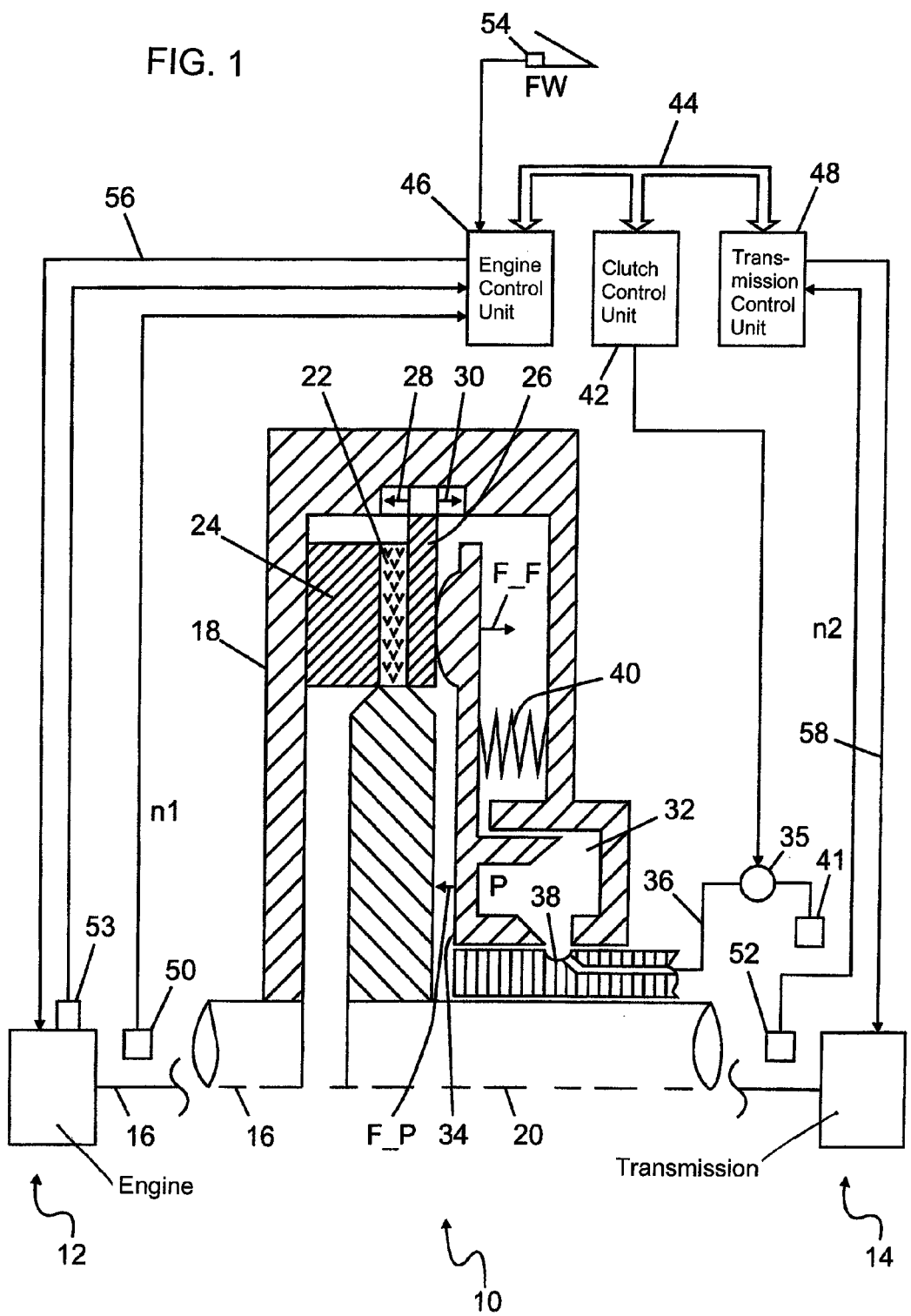
FIG. 1 is a diagrammatic, illustration of controllable friction clutch between an internal combustion engine and a change speed transmission.

Referring now to the figures of the drawing in detail and first, particularly, to FIG. 1 thereof, there is shown a controllable friction clutch 10 between an internal combustion engine 12 and a change speed transmission 14. The friction clutch 10 has a part 18 which is coupled in a rotationally fixed fashion to a crankshaft 16 of the internal combustion engine 12, and a driver disc 22 which is connected in a rotationally fixed fashion to a drive shaft 20 of the change speed transmission 14. The driver disc 22 rotates between two pressure plates 24 and 26 of the part 18. The pressure plate 26 is guided in an axially movable fashion in the part 18 in the direction of arrows 28, 30 by a spline, and is pressed against the driver disc 22 by a compressive force F_P onto a spring force F_F. The driver disc 22 is likewise axially movable, which can be implemented, for example, by spraying between the driver disc 22 and the transmission shaft 20.

The compressive force F_P is generated in the embodiment of FIG. 1 by an oil pressure P in a pressure space 32 which is sealed in an axially movable fashion by a transmitting element 34 which is connected to the part 18 in a rotationally fixed fashion. The pressure P is generated by a pressure actuator element 35 and is transmitted into the pressure space 32 via a pressure line 36 and a control group 38. The spring force F_F is generated in the embodiment of FIG. 1 by a tensile spring 40 which generates an axially directed tensile force between the transmitting element 34 and the part 18. Configurations with one or more compressive springs are likewise possible and customary.

At a lower oil pressure P, the spring force F_F is predominant and it relieves the driver disc 22 so that the friction clutch 10 opens, i.e. transmits less torque. In contrast, an increase in the oil pressure P causes the compressive and frictional forces acting between the driver disc 22 and the pressure plates 24, 26 top to become larger, therefore leading to closing of the clutch 10, that is to say to an increase in the maximum coupling torque which can be transmitted.

The pressure actuator element 35 is, for example, a controllable oil pump and/or a pressure control valve which connects the pressure line 36 to a pressure reservoir 41. The pressure actuator element 35 is controlled in the embodiment of FIG. 1 by a clutch control unit 42 which communicates with an engine control unit 46 and a transmission control unit 48 via a data bus 44. In this context it goes without saying that the functions of the control unit 42, 46 and 48 can also be carried out in a coordinate fashion by an individual control unit or by two individual control units. The three blocks 42, 46, 48 can be understood as interacting functional blocks if they are combined to form one control unit together with the bus 44.

In all cases, the control unit 42 or the block 42 which represents its function is configured, in particular programmed, to control the sequencing of one of the methods presented here or one of the embodiments of the methods.

In all cases, signals which are fed to one of the blocks 42, 46 and 48, and information about manipulated variables which are transmitted by one of the blocks 42, 46 and 48, are also made available to the respective other blocks of the blocks 42, 46 and 48. In the embodiment of the FIG. 1, in particular a signal n1 of a rotational speed sensor 50 on the internal combustion engine side of the friction clutch 10 and a signal n2 of a rotational speed sensor 52 on the change speed transmission side of the friction clutch 10 as well a signal FW of a request signal transmitter 54 of a driver are fed to the blocks 42, 46 and 48. As a result, in particular a rotational speed difference between the part 18 and the transmission shaft 20 can be determined from the signals of the two rotational speed sensors 50 and 52 when the friction clutch 10 is not completely closed.

From these signals and, if appropriate further signals from further sensors 53, the control units or the blocks 42, 46 and 48 form actuation signals for controlling the internal combustion engine 12, the friction clutch 10 and the change speed transmission 14. In the case of the internal combustion engine 12, in particular the charging of combustion spaces with air, the metering of fuel corresponds to this and the time of the start of combustion are controlled so that the internal combustion engine 12 makes available the torque, requested by the driver or by a function of a vehicle dynamics controller or some other function, as a coupling torque at the friction clutch 10.

Arrow 56 which points from the control unit 46 to the internal combustion engine 12 represents such actuation interventions. The arrow 58 which points from the transmission control unit 48 to the change speed transmission 14 correspondingly represents actuation interventions into the change speed transmission. It goes without saying that the hydraulically controllable friction clutch 10 according to FIG. 1 merely represents one complication of controllable friction clutches. Controllable friction clutches can, for example, be implemented as single-disc or multi-disc dry clutches or as multi-plate clutches which operate in an oil bath. In addition, according to the type of activation it is possible to differentiate hydraulically, pneumatically or electromagnetically activated controllable clutches. The invention can be used in conjunction with all the configurations of controllable friction clutches.

FIG. 2 shows an exemplary embodiment of a method according to the invention in terms of the way it is controlled by the blocks 42, 44 and 46 in FIG. 1. Here, steps 60 corresponds to a superordinate program for controlling the internal combustion engine 12 which is executed in the block 46. The block 46 determines, in particular, a value of the coupling torque M_K which is made available by the internal combustion engine 12 for transport to the friction clutch 10. The coupling torque M_K depends principally on the charging of combustion spaces of the internal combustion engine 12, the efficiency level of the combustion of these charges and the torque demand of secondary assemblies.

The operating parameters of the internal combustion engine 12 which are relevant for this, such as the intake air mass flow rate, rotational speed, ignition angle, fuel/air ratio, etc. are available in modern control units. Furthermore, modern control units already calculate a coupling torque M_K from the aforesaid values so that the invention to this extent does not make any further requirements of the block 46.

Step 62 in FIG. 2 represents this calculation, which is known per se, of the coupling torque M_K from operating parameters of the internal combustion engine 12. If the block 46 forms an instantaneous value of the coupling torque M_K, the instantaneous value is additionally averaged in step 62 to form an average value of the coupling torque M_K_average.

In addition, in block 62 a measure is formed of a changing part W (cf. FIG. 3) of the coupling torque M_K. The changing part is obtained as a sequence of the discontinuous mode of operation of the internal combustion engine 12 and of the oscillation properties of the transmission of force in the internal combustion engine 12 (torsional oscillations of the function 16) and the oscillation properties of the rest of the force transmission including the components of the friction clutch 10, of the change speed transmission 14 and of the rest of the force transmission to the driven wheels of a motor vehicle.

A possible measure for the changing part W is, for example, the difference between the peak value M_K_peak of the coupling torque M_K and of the unchanging part or average value M_K_average. Values for the changing part W may, for example, be stored in the block 46 in characteristic diagrams which are addressed as a function of operating parameters of the internal combustion engine 12 such as the load and/or the rotational speed. In this case, the peak value M_K_peak is obtained as a sum of a value which is read out from a characteristic diagram and an average value of the coupling torque M_K_average which is formed continuously from operating parameters of the internal combustion engine 12.

With the values M_K_average and M_K_peak which are required by averages of step 62, a value M_set-point is formed in step 64, the value representing a set point value for the maximum torque which can be transmitted by the friction clutch 10. In this context, M_set-point is formed in such a way that M_set-point is higher than the value M_K_average of the average coupling torque and lower than the peak value M_K_peak of the coupling torque M_K of the internal combustion engine 12. In this embodiment, M_set-point is formed as a function of a correction value K.

The value M_set-point constitutes a set point value for the maximum coupling torque which can be transmitted by the friction clutch 10, and it is formed by logically combining a first value K1 of the correction value K with the average coupling torque M_K_average. The logical combination is preferably carried out here additively or multiplicatively. The description of FIG. 3 is obtained with such an additive logical combination.

M_set-point is preferably formed by the block 42 in FIG. 1. Step 64 is joined by step 66 in which the friction clutch 10 is actuated in such a way that it only transmits torque values which are lower than the set point value M_set-point. In other words, the manipulated variables for controlling the friction clutch 10 is formed as a function of the set point value. The setting of the torque M_set-point to be transmitted is carried out by actuating the actuator element 35 by the clutch control unit 42, or the block 42.

FIG. 3 illustrates the technical effect of this method. In particular, FIG. 3 shows the time profile of the coupling torque M_K which has an average value or unchanging value M_K-average as well as a changing part with an amplitude W. The peak values M_K_peak are obtained as a sum of the unchanging part M_K-average and the amplitude W of the changing part. In addition, FIG. 3 shows the value of the torque M_set-point between the average value M_K_average and the peak value M_K_peak as an upper limit of the torque transmitted by the friction clutch 10. As is indicated by arrow 68, the value of M_set-point can either be closer to the peak value M_K_peak or closer to the average value M_K_average.

Since the value is between the two values M_K_average and M_K_peak in all cases, the friction clutch 10 will briefly slip when the clutch torque peaks occur. In contrast to the process mentioned at the beginning for controlling a slip in converter lockup clutches, in the invention no defined continuous step is therefore set. The clutch slips only briefly if the torque acting at the friction clutch 10 rises above the set coupling torque M_set-point which can be transmitted.

During this slipping process, there are two favorable effects: the changing products which excites oscillations is reduced and furthermore the entire oscillation system composed of the internal combustion chamber 12 and the rest of the drive train is divided in the brief slip phase in two oscillation systems, specifically the internal combustion engine 12 and the rest of the drive train with the change speed transmission 14. As a result, the excitable natural frequencies also change. In general, the current engine speed n1, which under certain circumstances correlates to a resonance of the entire oscillation system when a peak value M_K_peak occurs, no longer correlates to the natural frequencies of the two individual oscillation systems. As a result, the rotational oscillation amplitudes at the input to the change speed transmission 14, and thus also the disruptive rattling noises, are significantly reduced.

As a result of wear and/or temperature effects, the correlation between the manipulated variable for influencing the torque which can be transmitted and the torque which can actually be transmitted during operation of the friction clutch will change. In order, and nevertheless, to control the friction clutch in such a way that the torque peaks are cut off without at the same time causing an undesirably high or low slip, in one preferred embodiment a measure of the actually transmitted torque is formed from operating parameters of the drive train and the set point value and/or the manipulated variable are additionally formed as a function of the measure.

Figure 4:
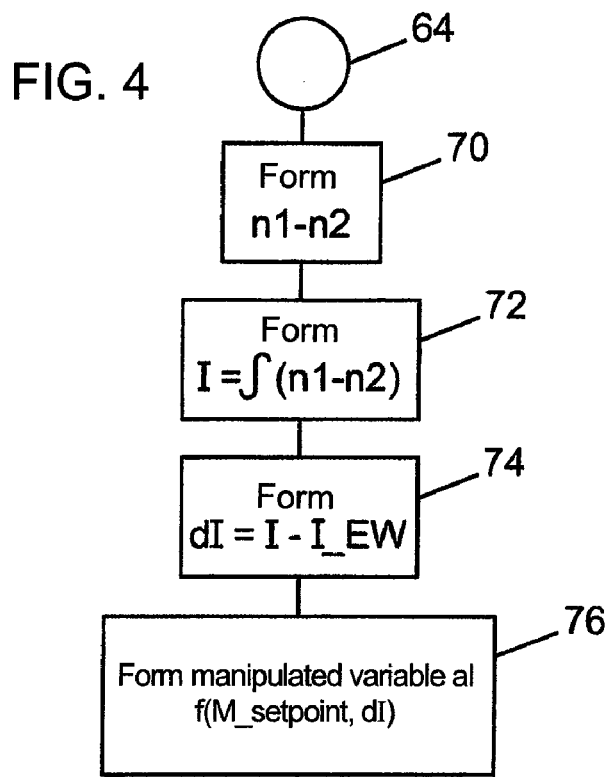
FIG. 4 is a flow chart illuminating a method of an embodiment of the method within an adaptation for taking into account the actually transmitted torque.

FIG. 4 shows such an embodiment in the form of a flowchart which replaces the step 66 in FIG. 2. As a result, the predefinition of the set point value M_set-point and/or the predefinition of the manipulated variable in a closed circuit control loop can be adapted to the aforesaid changes. The rotational speed n1 on the primary side (internal combustion engine side) of the friction clutch 10 and the rotational speed n2 on the secondary side (change speed transmission side) of the friction clutch 10 are preferably used as operating parameters.

In order to form a measure of the torque which is actually transmitted by the friction clutch 10, the difference between the rotational speeds n1 and n2 is first formed in step 70. Since these rotational speeds are recorded spatially separately from one another, a torsional oscillation, which is superimposed on the actual difference in rotational speed between the drive disc 22 and pressure plates 24, 26, occurs between them particularly in the case of resonance. The instantaneous value of the difference in rotational speed therefore in fact does not map the difference in rotational speed between the driver disc 22 and pressure plates 24, 26 in an unfortified way in the case of resonance.

However, slipping of the clutch is apparent from displacements of the average value and the difference. If n2 is subtracted from n1 and n2 is becoming smaller because of the slipping clutch, the average value of the difference changes in the direction of large values. In order to register this change, an integral I of the difference between the two rotational speeds n1, n2 is formed over a predefined integration time interval or integration angle interval in step 72.

The value of the integral is minimal without slips between the driver disc 22 and the pressure plates 24, 26 and increases as the slip rises. A minimal slip corresponds to complete transmission of the coupling torque which is made available by the internal combustion engine 12. Values which deviate from the minimum value of the integral can be mapped onto the torque which can be transmitted for a known drive train.

Figure 5:
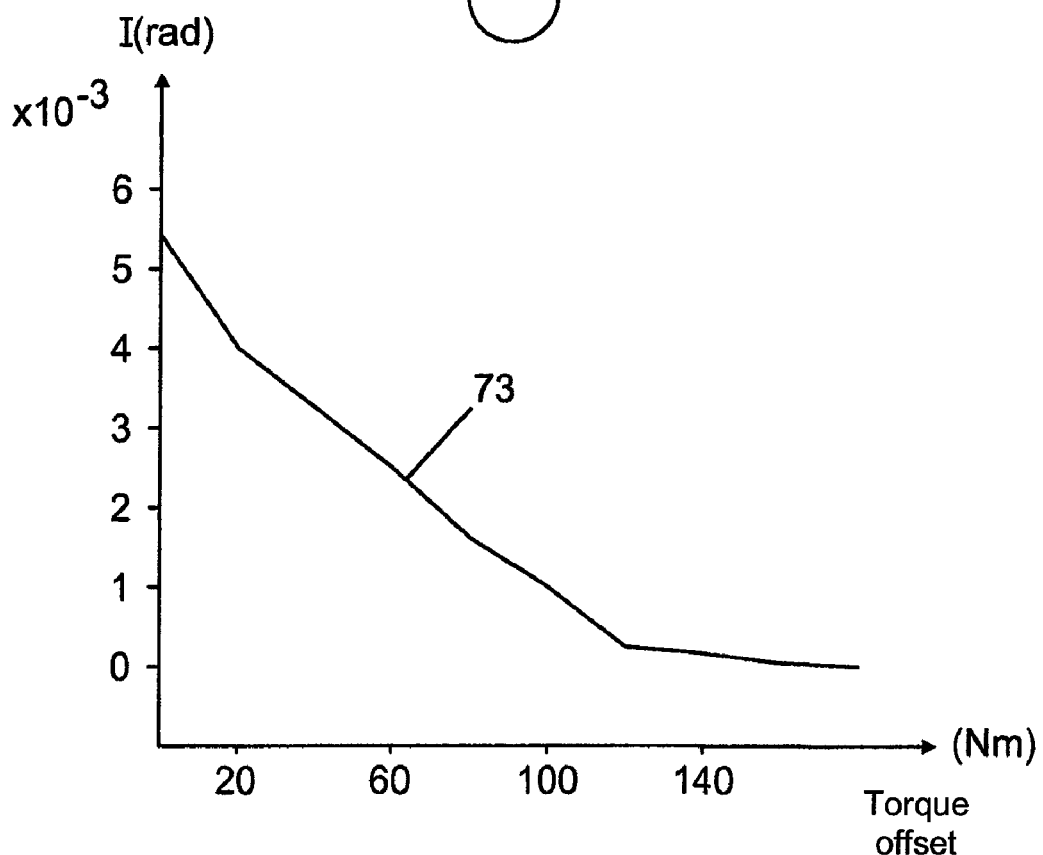
FIG. 5 is a graph showing a characteristic curve which specifies a relationship, used in the adaptation, between the measurement vehicles and the slip.

FIG. 5 shows a mapping in the form of a characteristic curve 73 in which values of the integral I with the angle unit rad are plotted against an additive portion or torque offset with respect to the average coupling torque M_K_average. As is apparent, the integral of the difference rises, as anticipated, as the offset becomes smaller.

This behavior permits the correlation between the predefined set point value and the predefined manipulated variable to be adapted during the actuation of the friction clutch 10: for this purpose, in a step 74 in FIG. 4 the value which is formed for the integral I is compared with an anticipated value I_EW for the integral I by forming a difference dI=I-I_EW. After this, in step 76 the manipulated variable is formed as a function of M_set-point and dI in such a way that the friction clutch 10 transmits more torque if the integral I is higher than the anticipated value I_EW, and transmits less torque if the integral I is lower than the anticipated value I_EW.

If it is wished, for example, to set an additive torque offset of 20 Nm in the conditions in FIG. 5, according to the profile of the characteristic curve 73 a specific value of the integral I, which is somewhat lower than 0.004 rad in the case in FIG. 5, is anticipated. If the value of another integral I which is actually formed, is then lower than the anticipated value which is predefined by the characteristic curve 73, this results in that the manipulated variable which is used still generates too little slip. Correspondingly, the correlation, used in the control unit 42, between the correction value and manipulated variable is changed in such a way that the slip increases.

If the value of the integral I which is actually formed is, on the other hand, higher than the anticipated value which is predefined by the characteristic curve 73, the manipulated variable which is used generates too much slip. Correspondingly, the correlation, used in the control unit 42, between the correction value and the manipulated variable is changed in such a way that the slip is reduced. In contrast to the slip control which was mentioned at the beginning, no complex, high-resolution angular sensor system or signal processing device are required for the adaptation. The rotational speeds n1 and n2 can be registered with the comparatively simple rotational speed sensors and the signal processing is not associated with particular expenditure either, by virtue of the formation of integrals.

In order to achieve the aimed at avoidance/reduction in rattling noises it is not necessary for the cutting off of the torque peaks which is illustrated in FIG. 3 to take place over the entire rotational speed spectrum. The rattling noises occur as a result of resonant effects only in specific rotational speed ranges and/or load/rotational speed ranges. Since the cutting of the torque peaks takes place under load, in principle it shortens the service life of the clutch. Furthermore, it reduces the efficiency of the transmission of power, even if only slightly.

In one preferred embodiment, the cutting off of the torque peaks therefore takes place only in a specific range of one or more operating parameters of the internal combustion engine in which resonances occur. In one embodiment, outside this range logical combination of a second correction value occurs to form a separate value in which even periodically occurring peak values of the coupling torque are transmitted.

Figure 6:
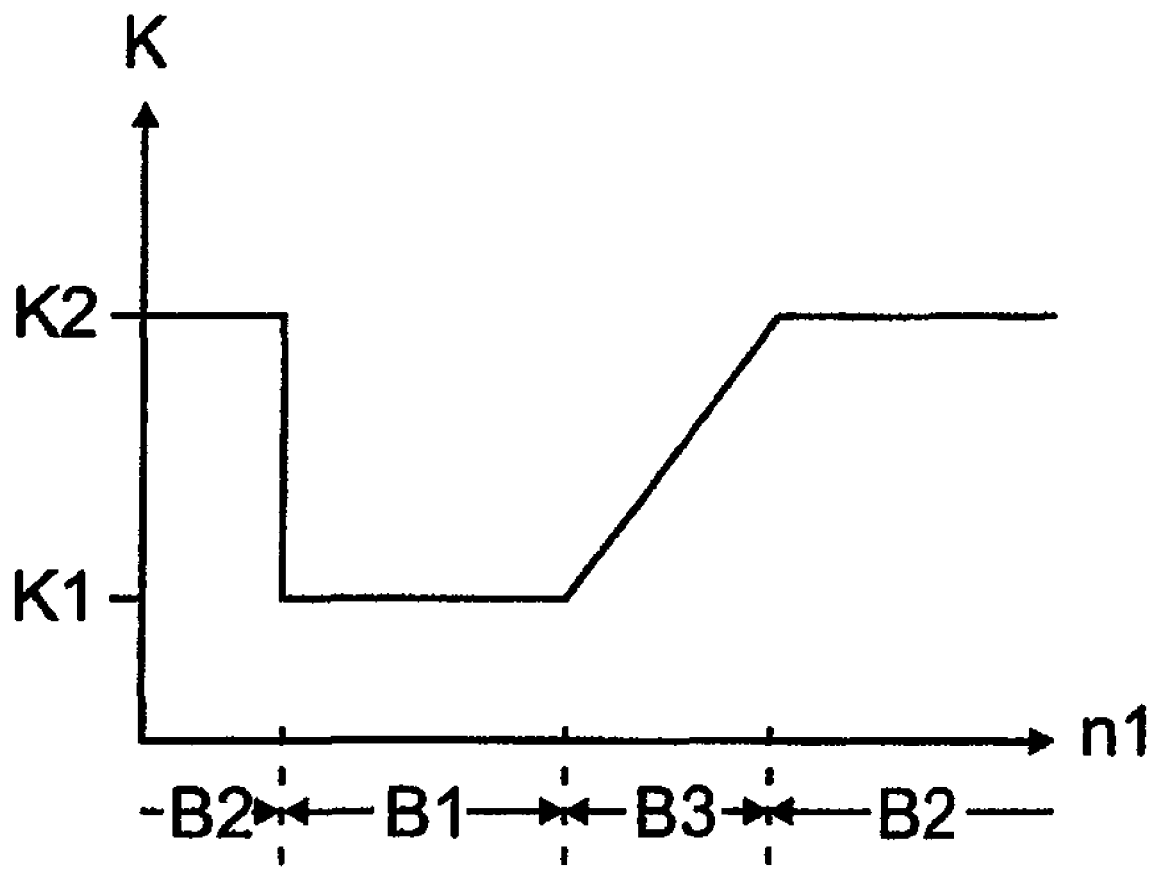
FIG. 6 is a graph showing a possible assignment of correction values K to values of a rotational speed as a relevant operating parameter.

FIG. 6 shows a possible assignment of correction values K on the ordinate to ranges of rotational speed n1 as relevant operating parameters on the abscissa. In a first range B1, a first correction value K1 has a comparatively low value of, for example, 20 Nm. Irrespective of this numerical value which serves only as an example, K1 is to be dimensioned in such a way that the frictional clutch 10 exhibits the described discontinuous slip behavior in which the torque peaks are cut off. The first range B1 is preferably located in such a way that it surrounds a resonant rotational speed.

Outside the environment B1 of the resonant rotational speed, two ranges B2 are provided in which a second correction value K2 is used. The second correction value K2 is preferably dimensioned in such a way that the frictional clutch 10 also transmits the torque peaks. Outside of resonant rotational speeds, this is unproblematic since no transmission rattling occurs there.

As a result of this embodiment, the losses in efficiency which are associated with the capping of the periodically occurring peak values outside the predetermined range are avoided, which increases the drive efficiency overall, reduces the wear of the friction clutch 10 and thus lengthens its service life. Given a value of the first correction value K1 of 20 Nm, a value of 70 Nm is a typical value K2. Furthermore, FIG. 6 shows a third range B3 in which the correction value K rises continuously from K1 to K2 as the rotational speed n1 rises. As a result, a jolt in the drive train at the transition between the ranges B1 and B2 is avoided. It goes without saying that such a transition range with a correction value K which varies continuously instead of in jumps can also be used on the low rotational speed side of the range B1.

The invention claimed is:

1. A method for controlling a friction clutch between an internal combustion engine and a change speed transmission, which comprises the steps of:
   forming a measure of an average coupling torque;
   forming a variable for controlling the friction clutch in dependence on a set point value, the set point value lying between the average coupling torque and periodically occurring peak values being an upper limit of a torque to be transferred by the friction clutch; and controlling the friction clutch such that a slip of the friction clutch with reduced power transmission being permitted in a case of the periodically occurring peak values of the torque occurring.

2. The method according to claim 1, which further comprises:
logically combining the average coupling torque with a first correction value to form the set point value for a maximum coupling torque to be transmitted given the average coupling torque.

3. The method according to claim 2, wherein outside a predetermined range of a rotational speed of the internal combustion engine in which the logical combination with the first correction value takes place, logically combining the average coupling torque with a second correction value to form a further set point value at which periodically occurring peak values of the coupling torque are also transmitted.

4. The method according to claim 2, which further comprises:
forming a measure of an actually transmitted torque from operating parameters of at least one of the internal combustion engine, the friction clutch and the change speed transmission; and
forming at least one of the set point value and the variable in dependence on the measure.

5. The method according to claim 4, which further comprises using a first rotational speed on a primary side of the friction clutch and a second rotational speed on a secondary side of the friction clutch as the operating parameters.

6. The method according to claim 5, which further comprises:
forming an integral of a difference between the first and second rotational speeds resulting in a integral value; and
forming the measure in dependence on the integral value.

7. The method according to claim 6, which further comprises:
comparing the integral value with an anticipated value for the integral; and
changing the variable such that the friction clutch transmits more torque if the integral is higher than the anticipated value, and transmits less torque if the integral is lower than the anticipated value.

8. A control system for controlling a friction clutch between an internal combustion engine and a change speed transmission, the control system comprising:
a control unit programmed to:
form a measure of an average coupling torque;
form a variable for controlling the friction clutch in dependence on a set point value, the set point value lying between the average coupling torque and periodically occurring peak values as an upper limit of a torque to be transferred by the friction clutch; and
controlling the friction clutch such that a slip of the friction clutch with reduced power transmission being permitted in a case of the periodically occurring peak values of the torque occurring.

9. The control system according to claim 8, wherein said control unit is programmed to:
logically combine the average coupling torque with a first correction value to form the set point value for a maximum coupling torque to be transmitted given the average coupling torque.

10. The control system according to claim 9, wherein outside a predetermined range of a rotational speed of the internal combustion engine in which the logical combination with the first correction value takes place, said control unit is programmed to logically combine the average coupling torque with a second correction value to form a further set point value at which periodically occurring peak values of the coupling torque are also transmitted.

11. The control system according to claim 9, wherein said control unit is programmed to:
form a measure of an actually transmitted torque from operating parameters of at least one of the internal combustion engine, the friction clutch and the change speed transmission; and
form at least one of the set point value and the variable in dependence on the measure.

12. The control system according to claim 11, wherein said control unit is programmed to use a first rotational speed on a primary side of the friction clutch and a second rotational speed on a secondary side of the friction clutch as the operating parameters.

13. The control system according to claim 12, wherein said control unit is programmed to:
form an integral of a difference between the first and second rotational speeds resulting in a integral value; and
form the measure in dependence on the integral value.

14. The control system according to claim 13, wherein said control unit is programmed to:
compare the integral value with an anticipated value for the integral; and
change the variable such that the friction clutch transmits more torque if the integral is higher than the anticipated value, and transmits less torque if the integral is lower than the anticipated value.

* * * * *